United States Patent

Ostholt et al.

[11] Patent Number: 5,339,944
[45] Date of Patent: Aug. 23, 1994

[54] DEVICE FOR DISPLACING ARTICLES FROM A MOVING TRANSPORT PATH

[75] Inventors: Rüdiger Ostholt, Wetter; Klaus Aichholz, Bissersheim, both of Fed. Rep. of Germany

[73] Assignee: Mannesmann Aktiengesellschaft A Corporation of Germany, Dusseldorf, Fed. Rep. of Germany

[21] Appl. No.: 883,980

[22] Filed: May 18, 1992

[30] Foreign Application Priority Data

May 16, 1991 [DE] Fed. Rep. of Germany ....... 4116323

[51] Int. Cl.$^5$ ............................................. B65G 47/26
[52] U.S. Cl. ...................................... 198/430; 198/740
[58] Field of Search ................... 198/372, 430, 468.1, 198/598, 740

[56] References Cited

U.S. PATENT DOCUMENTS

| | | | |
|---|---|---|---|
| 2,480,294 | 8/1949 | Hume | 198/814 |
| 2,590,183 | 3/1952 | Keesling | 198/814 |
| 2,781,121 | 2/1957 | Brandenberger | 198/430 |
| 2,814,378 | 11/1957 | Ekholm | 198/372 |
| 3,917,053 | 11/1975 | Matsuyama | 198/740 |
| 4,073,374 | 2/1978 | Hinchcliffe et al. | 198/430 |
| 4,164,278 | 8/1979 | Gurioli | 198/740 |
| 4,306,401 | 12/1981 | Stohlquist et al. | 198/740 |

FOREIGN PATENT DOCUMENTS 1431848 3/1966 Fed. Rep. of Germany ...... 81 E/79

*Primary Examiner*—Joseph E. Valenza
*Attorney, Agent, or Firm*—Cohen, Pontani, Lieberman, Pavane

[57] ABSTRACT

A device for the translation or discharge of articles from a transport conveyor to a discharge conveyor includes a push-off ledge that is moveable into the transport conveyor path. The elongated push-off ledge is pivoted at each of its ends to an endless pull member that is guidely driven around a start-deflection roller, an out-deflection roller and a displaceably-tensioned guide roller that are rotatable about vertical roller shafts. Each of the pair of pull members are synchronously driven so that the push-off ledge remains substantially parallel to the conveyor's article transport direction while the ledge is advanced, for displacing an article from the transport to the discharge conveyor, at an oblique angle to the article transport direction. The push-off ledge is retracted substantially perpendicular to the transport direction, thereby avoiding interference with following articles being carried on the transport conveyor.

11 Claims, 3 Drawing Sheets

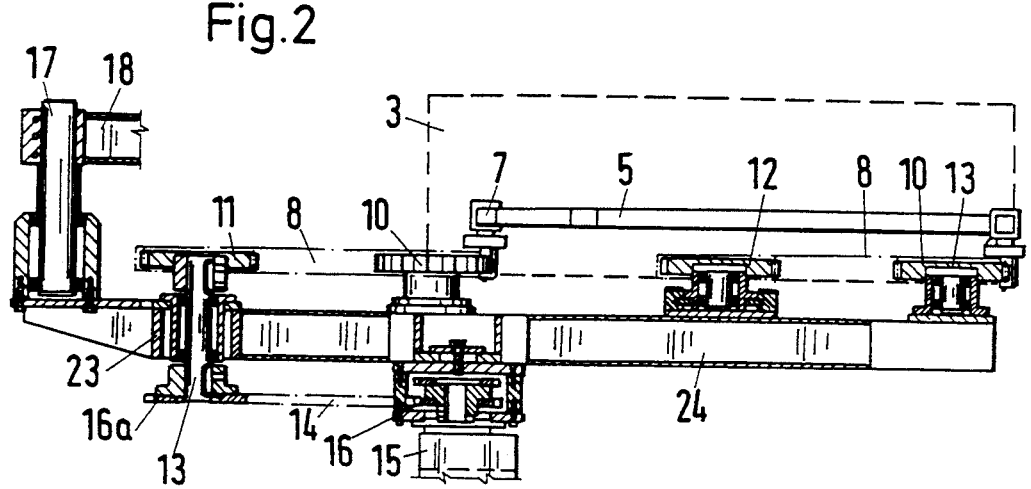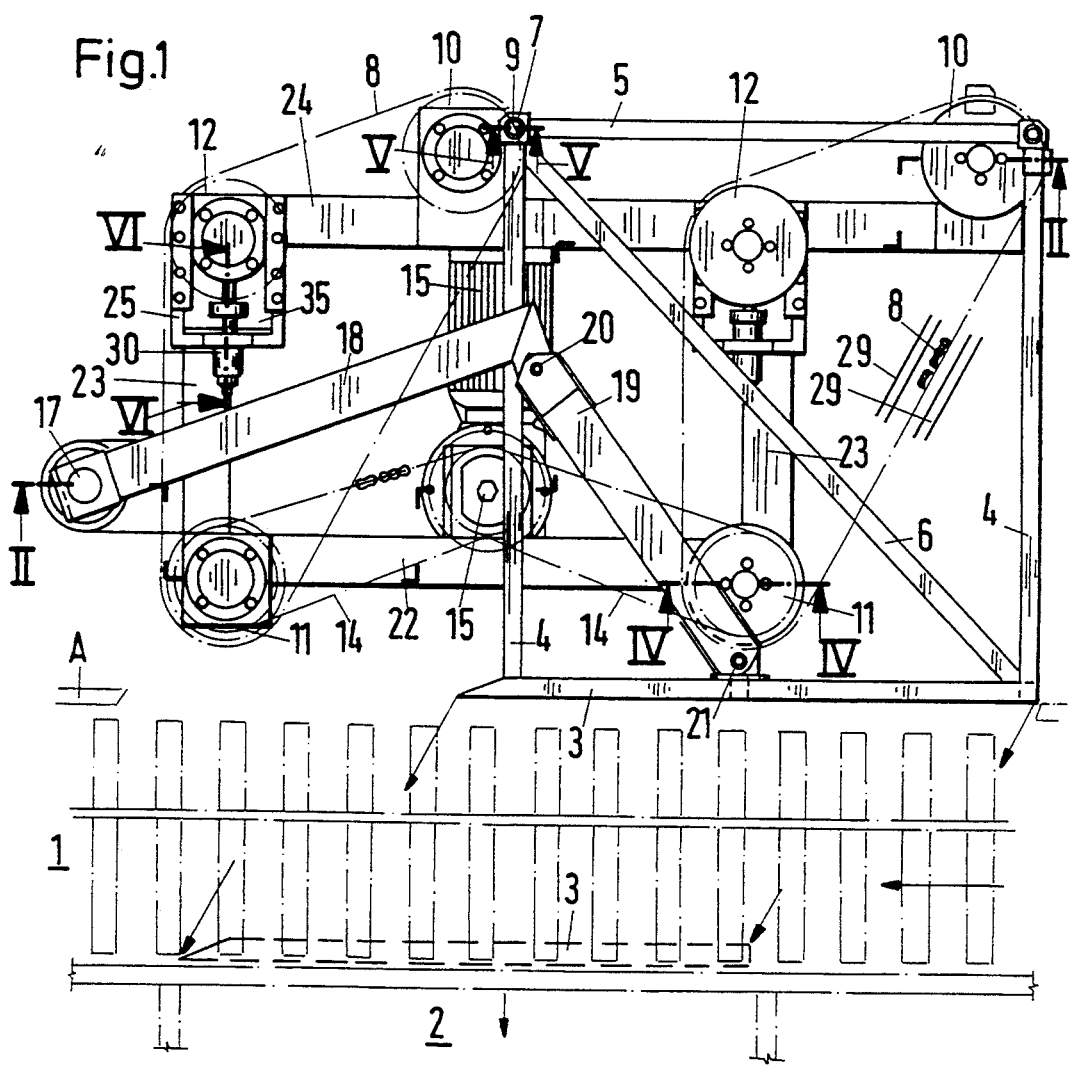

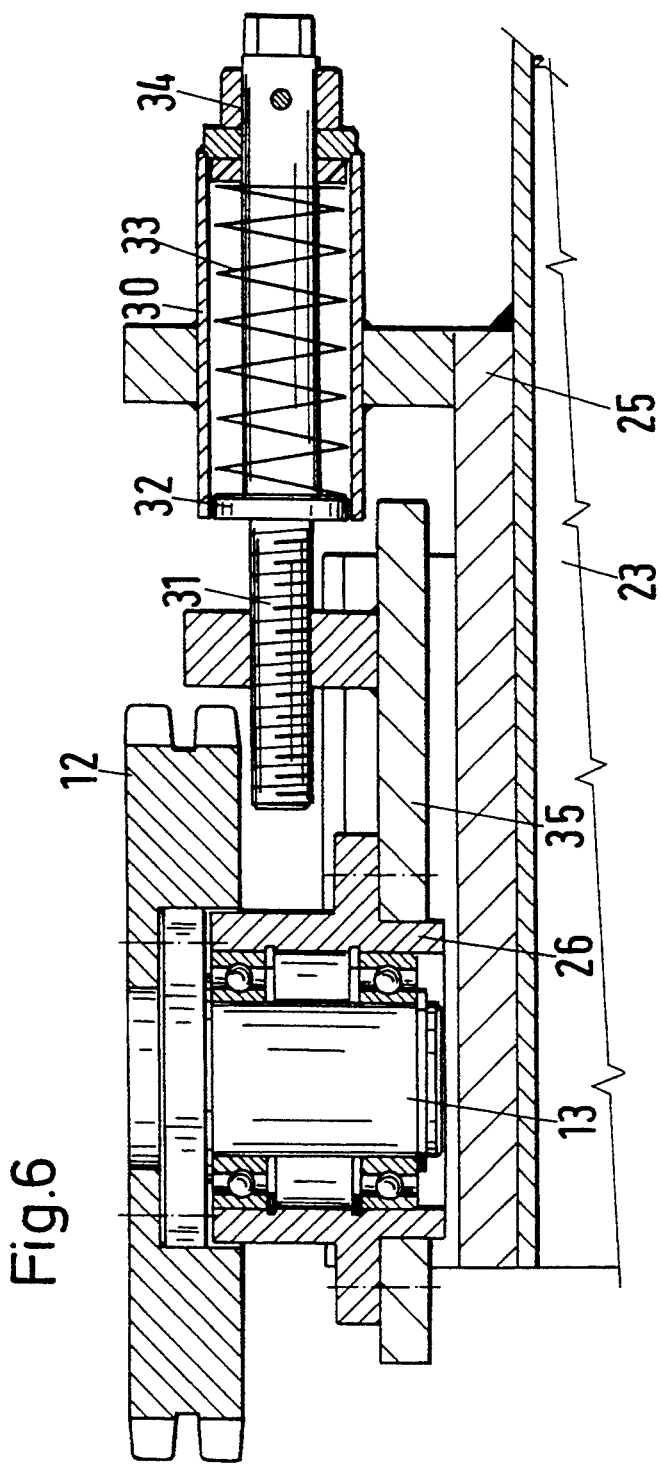

DEVICE FOR DISPLACING ARTICLES FROM A MOVING TRANSPORT PATH

FIELD OF THE INVENTION

The present invention is directed to a device operable for the displacement of articles from an article-transporting conveyance path onto a discharge path.

BACKGROUND OF THE INVENTION

Devices for operatively displacing articles being transported along a moving article-transporting path, such as a conveyor belt or the like, into or onto an adjacent or associated discharge path or conveyor or slide or other receiving surface are known in the art. Such a device is, for example, disclosed in Federal Republic of Germany Utility Model 77 10 777.

Another such discharge device is shown in Federal Republic of Germany 31 41 100 A1, in which one arm of a three-armed spider is rotated into the transport conveyor path. The arm thereby contacts the front edge of an advancing article or parcel to be discharged whereby the article is partially rotated for displacement onto the associated discharge conveyor or surface. This device requires that there be suitable spacing between individual articles being transported on the transport conveyor. Moreover, if the parcel is not grasped or deflected by the rotating arm at its front corner, as will often occur where an article has an arcuately-shaped or rounded end, the article will not be rotated by the arm and, for parallel displacement arrangements, the article may strike directly against and be halted by a guide roller of the device.

Another known article displacement device, disclosed in Federal Republic of Germany 36 24 411 A1, includes a four-arm spider. Since one arm always extends into the conveyance path, the spider is disposed above the articles and carries, on its arms, downwardly swingable push-off plates for contact with the conveyed articles. The push-off plates turn relative to the arms with rotation of the spider. When an article to be displaced is not grasped at its center of gravity or center of frictional resistance, the article may cant in an uncontrolled manner and, in addition, may carry with it onto the discharge path the next-following article advancing along the conveyance path. Furthermore, in this known device the push-off plates are fully rotatable and slide along the articles that they are to displace. Due to the arcuate course that an article follows in its displacement from the conveyance path, however, there is undesirable relative movement between the article and the push-off plate.

SUMMARY OF THE INVENTION

It is accordingly the desideratum of the present invention to provide a device for displacement of articles from a moving conveyance path and that overcomes the disadvantages of the prior art. It is a particular object of the invention to provide such a device which includes a push-off ledge or member that is coupled at its opposite ends to an endless pulling means, the device being operable for advancing the ledge across the conveyance path concurrently along and substantially perpendicular to the direction of article transport so as to reliably and controllably displace articles moving on the conveyance path onto an adjoining or associated discharge path.

These and other objects of the invention are achieved in the presently preferred device herein disclosed, by way of example, and constructed and operable in accordance with the invention.

The problems inherent in the reliable displacement of articles from a moving conveyance path, and the notable advance provided by the present invention, will perhaps best be understood by first describing the normal operating requirements in the context of a fairly typical application. Where, for example, a moving article conveyor path of an airline luggage distribution system is driven at a speed of 1.3 meters per second and the average spacing between individual articles of luggage is about 1.5 meters, approximately 3,000 pieces of luggage per hour can be transported along the path. If the push-off ledge deflects luggage to be displaced or discharged by about 60° from the original direction of conveyance and at a speed of about 2.3 meters per second over a conveyor path width of about 850 mm, the discharge or displacement time is approximately 0.4 seconds.

The available time interval for retraction or return of the push-off ledge over the conveyor path width is even shorter. The device of the present invention assures that this requirement of rapid push-off ledge return is also met through the provision of positive parallel guidance of the ledge, further assuring rapid and reliable displacement of an article from the conveyor path even where the advancing article is not grasped or contacted at its center of gravity by the center of the push-off ledge.

To displace an article from the conveyor path, the push-off ledge is advanced concurrently both perpendicular to and along the article transport direction so as to avoid unintended contact or interference with other articles being transported on the conveyor path and not currently intended for displacement therefrom. In its return movement, the push-off ledge is retracted across the conveyor path width substantially perpendicular to the direction of article transport, and only after the ledge has been retracted beyond the conveyor path width is the push-off ledge returned in the direction opposite that of article transport to the starting position for commencement of a subsequent article-displacement operation. The push-off ledge is therefore substantially never unnecessarily disposed within the article-transport region of the conveyor path for unintended contact with other articles being transported or moving along the path. As a consequence, the following article being conveyed on the path can safely, during the return stroke interval of the push-off ledge, be further advanced along the conveyor path by approximately the distance of ledge travel along the transport direction—generally corresponding to the distance between start-deflection rollers and associated guide rollers in the herein disclosed device—without colliding with the push-off ledge. At least the guide rollers have their roller shafts supported in bearing receiving frames of a machine frame that is positionally fixed relative to the conveyor path, the machine frame being formed of an interengaged arrangement of a flanged girder, two transverse girders and a longitudinal girder. The bearing receiving frames are secured to the transverse girders and the guide rollers are displaceably carried in the bearing receiving frames by tensioning devices.

The push-off ledge is advanced and retracted through movement of pull members, as herein disclosed in the form of a pair of lamellar tooth chains trained about the guide and start-deflection rollers and an out-deflection roller forming the vertices of a chain path of substantially triangular configuration. Connecting bolts defining drive pins for the push-off ledge engage the chains and are guided, at least in the advancing movement of the ledge, by roller bearings carried in guide rails. The out-deflection rollers are connected by drive pull members and toothed gears to a common push-out drive implemented by a motor having associated angular gearing.

As a further aspect of the invention, the push-off ledge is constructed as a portion of a frame including a longitudinal girder, located opposite the push-off ledge, connected to the pull member tooth chains by the drive pins. This frame is carried at the push-off ledge by an articulatable pivot arm which is secured at one end by a pivotable joint to the ledge and, at the other, is mounted on a vertical shaft disposed adjacent or proximate the conveyor path.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements throughout the several views:

FIG. 1 is a top plan view of a path-conveyed article discharge or displacement device constructed in accordance with the present invention and showing an associated article conveyance path;

FIG. 2 is a sectional view taken along the lines II—II in FIG. 1;

FIG. 6 is a sectional view taken along the lines VI—VI in FIG. 1, and rotated 90° into working position.

DETAILED DESCRIPTION OF THE PREFERRED EMBODIMENT

Figure 3:
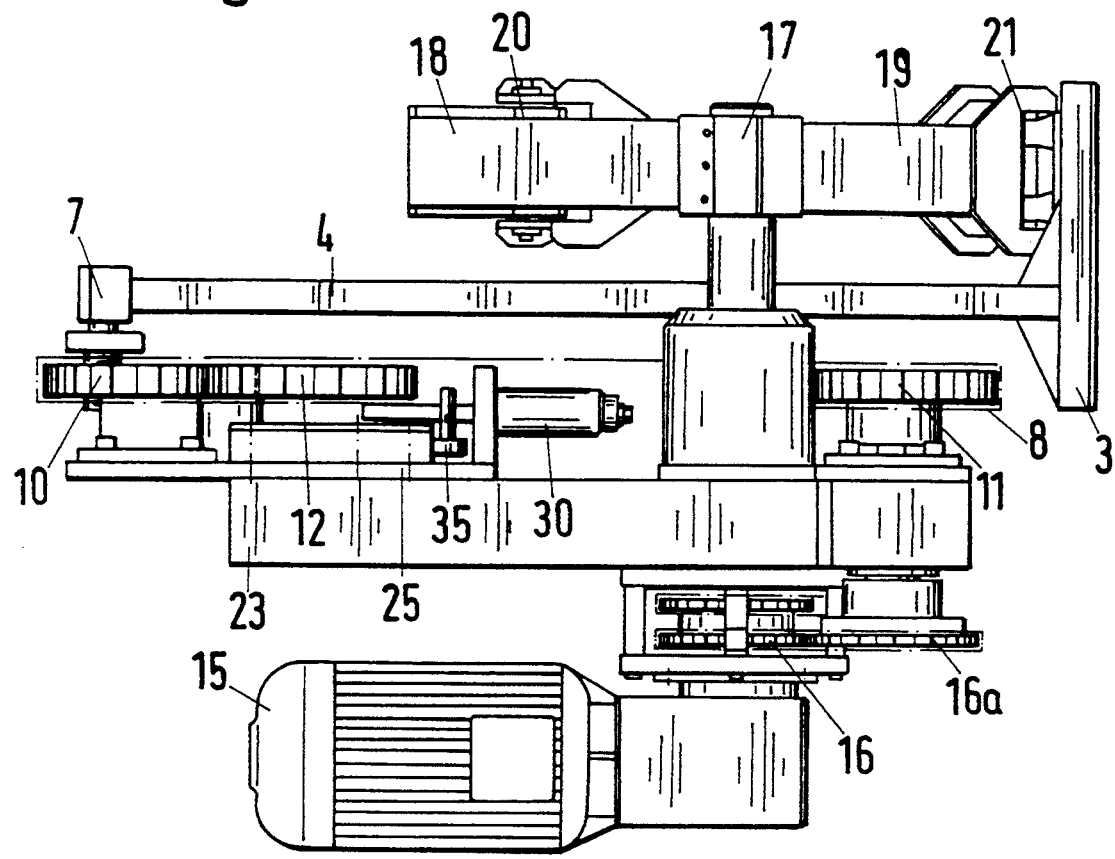
FIG. 3 is an enlarged end view taken from the left side of FIG. 2.

In FIG. 1, an article conveyance or transport path 1 in association with which the device of the present invention may be utilized is depicted, solely by way of example and in dash-dot lines, as a roller conveyor. The direction of article transport or conveyance along the path 1 is indicated by the arrow 36 and, to conserve space, the transport conveyor is shown in the drawing as being somewhat narrower in width than is ordinarily the case in such conveyance apparatus. A discharge conveyor 2, which typically adjoins the conveyor path 1, is also identified in FIG. 1 in substantially parallel adjacency to the path 1 and may, by way of example, be implemented as a roller conveyor, a belt conveyor or an inclined chute or the like.

The present invention is directed to an apparatus or device operable for displacing articles moving along the transport conveyor 1 onto the discharge conveyor 2. In order to effect such article displacement from the conveyor 1, the inventive device includes a push-off member implemented as an elongated bar or ledge 3 extending generally parallel to the path 1 and that is advanced at an oblique angle of approximately 60° to the transport direction 36 so as to move across the width of the transport conveyor 1 and thereby transfer the conveyed article onto the discharge conveyor 2; the fully advanced position of the push-off ledge 3 is depicted by broken lines in FIG. 1. Thus, although the ledge 3 is advanced, for displacing an article from the conveyor 1, at an angle oblique to the article transport direction 36, the orientation of the ledge—i.e. substantially parallel to the transport direction in the disclosed device—remains generally constant. On the other hand, in alternate forms of the inventive device the push-off ledge may instead be oriented other than parallel to the article transport direction such, for example, as in some predetermined relation to a reference surface or member; in any event, it is generally intended that such orientation of the ledge 3 remain substantially the same as the ledge is advanced, and subsequently retracted, during operative use of the inventive device. It should also be noted that, in the initial or starting position of the ledge 3 (FIG. 1), the push-off ledge is located transversely behind or laterally recessed beyond a side cheek A of the transport conveyor 1; in the particular embodiment of the invention herein disclosed, after the ledge 3 has subsequently been fully retracted following an article-displacing advance movement it is temporarily recessed further still by a small amount, as will hereinafter be apparent.

The push-off ledge 3 forms a portion of a movable frame which also includes two transverse girders 4, another longitudinal girder 5 located in the frame opposite the ledge 3, and a stiffening strut 6 extending between diametrically opposed corners of the frame. Located at the frame corners between the transverse girders 4 and the longitudinal girder 5 are rotary plates or drive eyes 7 for drive pins 9 of two pull members 8 that carry one end of the frame. At its other or opposite end, the push-off ledge 3 is connected by a pivotable support joint 21 to a first articulated arm 19, the first arm 19 being pivotably attached to form an elbow joint to a second articulated arm 18 by an arm articulation joint 20. The second arm 18 is, at its opposite end, supported on at least one of the transverse girders 23 by a shaft 17.

Figure 4:
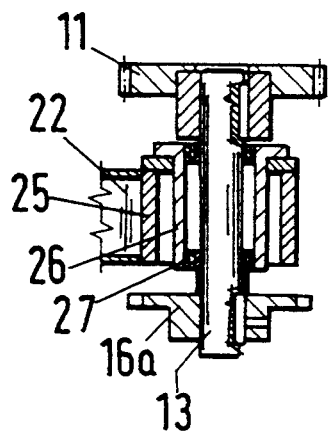
FIG. 4 is a sectional view taken along the lines IV—IV in FIG. 1.
Figure 5:
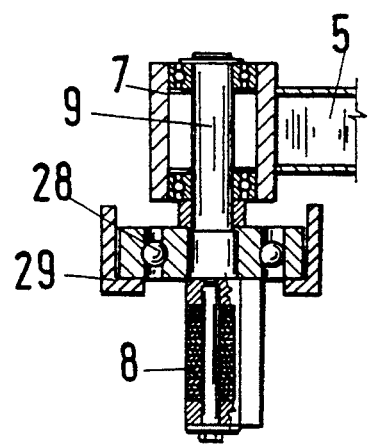
FIG. 5 is a sectional view taken along the lines V—V in FIG. 1.

The two pull members 8 are implemented by lamellar toothed chains, a connecting bolt passing through opposed links of the toothed chain (FIG. 5) forming each of the drive pins 9 for the frame that includes the push-off ledge 3. Each pull member 8 is trained about a start-deflection roller 10, an out-deflection roller 11 and a guide roller 12 to define a generally triangular chain run. In the FIG. 1 rest or starting position of the inventive article discharge device, the push-off ledge 3 is shown in its ready or waiting position, and the drive pins 9 are located at or closely proximate the start-deflection rollers 10. To commence an article displacement or discharge cycle, a push-off drive 15 implemented as a motor and associated angular gearing drives the gears 16a of the out-deflection rollers 11 through drive pull members 14 and motor gears 16 to rotate the out-deflection rollers 11 and thereby effect forward travel of the chains 8 about the rollers 10, 11, 12. As seen in FIG. 4, the gears 16a are connected to the out-deflection rollers 11 by roller shafts 13, the rollers 11 being disposed proximate the conveyor path 1.

As the motor-driven chains 8 initially move or advance about the rollers 10, 11, 12, the push-off ledge 3 advances concurrently in two directions—i.e. both perpendicular to and along the transport direction 36. An article being carried on or along the transport conveyor 1 is accordingly displaced or transferred from the conveyor 1 to the discharge conveyor 2 at an oblique angle of, in the presently-disclosed device, about 60° to the transport direction 36 by the corresponding advancing movement of the ledge 3. Outward advance of the push-off ledge 3, and displacement of an article from the transport conveyor 1 to the discharge conveyor 2, is complete when the pull chain-carried drive pins 9 have moved approximately half-way around the out-deflection rollers 11 and enter the region of the guide rollers 12. From this point, the push-off ledge 3 moves rapidly out of the conveyor path—traveling substantially perpendicular to the transport direction 36 and away from the conveyor 1—and, as the drive pins 9 move about and beyond the guide rollers 12, the ledge 3 returns to its initial or starting position of FIG. 1.

Since the distances between the start-deflection rollers 10 and the out-deflection rollers 11 are relatively large and these rollers must accommodate the potentially-considerable forces inherent in the displacement of moving articles from the transport conveyor 1, the two pull chains or members 8 may be guided during advancement of the push-off ledges 3 by roller bearings 28 carried in guide rails 29. Such an arrangement may, for example, be seen in FIG. 5 and at the right-hand side of FIG. 1.

The article discharge device of the invention is mountedly supported by a flanged girder 22 secured to or positionally fixed adjacent the conveyor path 1. The girder 22, together with two transverse girders 23 and a longitudinal girder 24, interengagedly define a machine frame of the discharge device. At its corners between the longitudinal girder 24 and the two transverse girders 23, the machine frame carries bearing receiving frames 25 including bearing bushings 26 for upper and lower bearings 27 by which the roller shafts 13 of the out-deflection rollers 11 are rotatively guided, as seen in FIG. 4 and at the left-hand side of FIG. 2. FIG. 2 also shows, at its right-hand side, the less complex arrangement of the roller shafts 13 of the guide rollers 12 and the start-deflection rollers 10 carried on the longitudinal girders 24.

The bearing receiving frames 25 also incorporate tensioning devices for displaceably mounting the guide rollers 12 to the frames 25 which, in turn, are supported by the transverse girders 23 (FIG. 6). Each bearing receiving frame 25 is fastened to one of the transverse girders 23 and includes, as a part of the tensioning device, a tube 23 welded to the frame 25. The tube 23 receives therein at least a collar 32 of a threaded rod 31. The collar 32 is biased outwardly from the tube interior, i.e. in the tensioning direction, by a coil-spring 33 disposed within the tube 23 and abutting at its opposite ends the collar 32 and the tube bottom. The spring-biased threaded rod 31 correspondingly displaces a guide plate 35 associated with the bearing bushing 25 of the guide roller shaft 13 to thereby tension the guide roller 12 relative to the bearing receiving frame 25 and maintain the pull members 8 in suitably tensioned condition about the rollers 10, 11, 12. A setting collar 34 of the tensioning device is effective for retaining the coil-spring 33 against escape during assembly of the device.

While there have been shown and described and pointed out fundamental novel features of the invention as applied to a preferred embodiment thereof, it will be understood that various omissions and substitutions and changes in the form and details of the device illustrated, and in its operation, may be made by those skilled in the art without departing from the spirit of the invention. It is the intention, therefore, to be limited only as indicated by the scope of the claims appended hereto.

What is claimed is:

1. A device operable for displacing an article from a moving transport path along which the article is conveyed in a transport direction to a discharge path, comprising:

an elongated push-off ledge oriented in predetermined relation to the transport path and having opposed ends;

a plurality of deflection rollers disposed in predetermined substantially fixed relation to the transport path;

means operable for rotatably driving at least one of said deflection rollers;

endless pull means trained about said plural deflection rollers for rotation about said rollers;

means connecting said opposed ends of the push-off ledge to said endless pull means for causing said ledge, as said pull means rotates about said rollers, to be advanced transversely across the transport path at an angle oblique to the transport direction for displacing an article from the transport path onto the discharge path, and to be subsequentially retracted substantially perpendicular to the transport direction, all while maintaining said predetermined orientation of the push-off ledge;

a machine frame including a flanged girder, a longitudinal girder and two transverse girders connecting the flanged and longitudinal girders, each of said plural deflection rollers including a roller shaft supported by said machine frame, said plurality of deflection rollers including a guide roller; and tensioning means connecting said transverse girder and said guide roller for bias-tensioning said endless pull means about said plurality of deflection rollers, said tensioning means including a tube, a threaded rod, a coil-spring disposed in said tube abuttingly captured between said threaded rod and a surface of said tube, a bearing bushing for the roller shaft of said guide roller, and a guide plate for said bearing bushing and engageable with said threaded rod for outwardly biasing the roller shaft of said guide roller and thereby tensioning said endless pull means.

2. A device in accordance with claim 1, wherein said connecting means comprises rotary joints including roller bearings connected to the endless pull means.

3. A device in accordance with claim 1, wherein said endless pull means comprises a pair of lamellar toothed chains and said connecting means comprises drive pins for coupling said push-off ledge to said toothed chains.

4. A device in accordance with claim 1, wherein said endless pull means comprises a pair of endless belts, and said drive means comprises a single drive for concurrently driving both said endless belts.

5. A device in accordance with claim 3, wherein said drive means comprises a single drive for concurrently driving both said toothed chains.

6. A device in accordance with claim 1, further comprising an articulated arm connected at one end to said push-off ledge and at an opposite end to a pivotable mount located proximate the transport path.

7. A device in accordance with claim 3, further comprising an articulated arm connected at one end to said push-off ledge and at an opposite end to a pivotable mount located proximate the transport path.

8. A device operable for displacing an article from a moving transport path along which the article is conveyed in a transport direction to a discharge path, comprising:

an elongated push-off ledge oriented in predetermined relation to the transport path and having opposed ends;

a plurality of deflection rollers disposed in predetermined substantially fixed relation to the transport path;

means operable for rotatably driving at least one of said deflection rollers;

endless pull means trained about said plural deflection rollers for rotation about said rollers;

means connecting said opposed ends of the push-off ledge to said endless pull means for causing said ledge, as said pull means rotates about said rollers, to be advanced transversely across the transport path at an angle oblique to the transport direction for displacing an article from the transport path onto the discharge path, and to be subsequently retracted substantially perpendicular to the transport direction, all while maintaining said predetermined orientation of the push-off ledge; and an articulated arm connected at one end to said push-off ledge and at an opposite end to a pivotable mount located proximate the transport path.

9. A device in accordance with claim 8, further comprising a rotary joint connecting said articulated arm one end to said push-off ledge.

10. A device according to claim 8, and further comprising a machine frame including a flanged girder, a longitudinal girder and two transverse girders connecting the flanged and longitudinal girders, and wherein each of said plurality of deflection rollers includes a roller shaft supported by said machine frame.

11. A device according to claim 10, wherein said plurality of deflection rollers includes a guide roller, and further comprising tensioning means connecting said transverse girder and said guide roller for bias-tensioning said endless pull means about said plural deflection rollers.

* * * * *